United States Patent [19]
Zakikhani

[11] Patent Number: 6,162,340
[45] Date of Patent: Dec. 19, 2000

[54] MEMBRANE FILTRATION OF POLYMER CONTAINING SOLUTIONS

[75] Inventor: Mohsen Zakikhani, Birmingham, United Kingdom

[73] Assignee: Albright & Wilson UK Limited, West Midlands, United Kingdom

[21] Appl. No.: 09/139,791

[22] Filed: Aug. 25, 1998

[30] Foreign Application Priority Data

Feb. 25, 1998 [GB] United Kingdom .................... 9803812

[51] Int. Cl.⁷ .................................................. B01D 61/44
[52] U.S. Cl. ........................................... 204/530; 210/651
[58] Field of Search ..................... 204/529, 530; 210/651

[56] References Cited

U.S. PATENT DOCUMENTS 3,394,068  7/1968  Calmon et al. ......................... 204/524
5,282,939  2/1994  Voss ........................................ 204/688

OTHER PUBLICATIONS

Schmidt, "Denitrification in Drinking Water" Chemical Abstracts (abstract only), Apr. 1997.

*Primary Examiner*—Arun S. Phasge
*Attorney, Agent, or Firm*—Frishauf, Holtz, Goodman, Langer & Chick, P.C.

[57] ABSTRACT

In a method for recovering polymers in a substantially pure form from a solution containing the polymers, the solution is first treated with a reactant (e.g. an acid, a sequestrant or a mixture of both) to form the free polymers and salts of the reactant. Second, the solution is treated to remove the salts therefrom and in a final stage the polymer solution is concentrated and the polymers recovered. The second treatment step may consist of membrane-filtration, ion-exchange or electrodialysis.

8 Claims, No Drawings

MEMBRANE FILTRATION OF POLYMER CONTAINING SOLUTIONS

The present invention relates to the recovery of substantially pure polymers from aqueous solutions.

Phosphonic acid—containing polymers are used in the treatment of metal (particularly aluminium) surfaces. Such treatment may, for example, comprise dipping a metal plate into a bath containing a solution of the polymer or spraying a metal plate with a solution of the polymer.

For example, the bath, prior to application to the metal surface, may consist essentially of a solution of a polymer such as poly-vinylphosphonic acid, poly (vinylphosphonic acid-co-acrylic acid), poly (vinylphosphonic acid-co-methacrylic acid) or poly (vinylphosphonic acid-co-acrylic acid-co-vinylsulphonic acid).

Alternatively, the bath may contain polymers including vinylidene-1, 1-diphosphonic acid (VDPA), such as poly (VDPA), copolymers or terpolymers of VDPA with other water-soluble monomers (e.g. acrylic acid or vinylsulphonic acid), VDPA—functionalised polymers or polymers containing phosphono-succinic acid.

Although the polymer content is depleted during application, a considerable amount of unreacted polymer remains in the spent bath. Moreover, the spent bath contains polymer residues in the form of metal/polymer complexes, e.g. aluminium/polymer complex or iron/polymer complex. The presence of such complexes in the spent bath can be indicated by an increase in the apparent molecular weight of the polymer (as shown by gel-permeation chromatography) as well as a general broadening of $^{31}P$ nmr signals. The presence of such complexes in the spent bath can also be indicated by the formation of a white precipitate where the metal ion content of the bath exceeds about 200 p.p.m.

Hitherto, the spent bath has been disposed of by neutralising the waste and filtering off the resulting polymer-containing solids (which have been used for landfill purposes).

We have now found a simple and economic method of recovering polymers in substantially pure form from solutions such as reaction solutions or waste process solutions.

Accordingly the present invention provides a method for recovering polymers in a substantially pure form from a solution containing said polymers, in which the method comprises the steps of (a) treating the solution with a reactant so as to form the free polymers and one or more salts of said reactant; (b) treating the solution to remove the salts therefrom and (c) concentrating the polymer solution to recover the polymer therefrom.

The reactant used in the treatment step (a) may be, for example, an acid (such as sulphuric acid, hydrochloric acid or phosphoric acid). Alternatively, the reactant may be a sequestrant (such as 1-hydroxyethane-1, 1-diphosphonic acid) or a mixture of said acid and said sequestrant.

In a first preferred embodiment of the present invention, the treatment step (b) comprises membrane-filtration of the solution.

In a second preferred embodiment of the present invention, the treatment step (b) comprises contacting the solution with an ion-exchange resin.

In a third preferred embodiment of the present invention, the treatment step (b) comprises electrodialysis of the solution.

The polymers may be copolymers of vinylphosphonic acid and acrylic acid, copolymers of vinylphosphonic acid and methacrylic acid, homopolymers or oligomers of vinylphosphonic acid, or terpolymers of vinylphosphonic acid, acrylic acid and vinylsulphonic acid.

Alternatively, the polymers may be homo-, co- or terpolymers of VDPA, VDPA-functionalised polymers or polymers containing phosphono-succinic acid.

The polymers may be present in pure or impure forms in the solution.

Typically, the solution from which the polymer is to be recovered includes one or more aluminium/polymer complexes. Acidification of the solution with an acid (e.g. sulphuric acid, hydrochloric acid or phosphoric acid) reverses the complex to form the free polymer and the salt of said acid (e.g. aluminium sulphate or aluminium chloride).

Treatment by membrane-filtration separates the aluminium salts and other low molecular weight impurities and/or by-products from the polymer solution. The polymer solution is then concentrated and the free polymer recovered.

Treatment by ion-exchange can likewise be employed to reverse the metal/polymer complex and return the polymer to its original form.

Treatment by electrodialysis can be applied either to the spent bath or to the acidified spent bath.

Preferably, the membrane may be made from a ceramic material or from one or more polymeric materials.

Alternatively, the membrane may comprise a layer of a polymeric material supported on a paper substrate.

The cut-off size of the membrane is determined by reference to the molecular weight of the polymer to be recovered from solution. The membrane prevents substances having a molecular weight higher than the upper limit of the molecular weight range of the membrane from passing therethrough.

The solution from which the polymer is recovered may be a reaction solution. Alternatively, the solution may be a waste process solution containing polymers, for example a spent bath from lithographic plate covering.

Preferably, the solution from which the polymer is recovered is an aqueous solution.

The present invention will be illustrated, merely by way of example, as follows:

EXAMPLE 1
Isolation of poly(vinylphosphonic acid-co-acrylic acid)

The pH of 10 l of a 20% solution of spent bath (made by concentrating a 1 g/l solution of spent bath) was adjusted to about 0.5 by adding about 740 ml of 98% sulphuric acid.

The solution was diafiltered using an ES404 membrane (available from PCI Membrane Systems Limited, England) until 3 to 4 volume equivalents of water had passed through the system at a module inlet pressure of 10 bar.

The volume of the solution was then reduced to achieve a 20% solution of the polymer.

The solution was spray-dried (using apparatus available from Croda Colloids Limited, England) and the polymer was isolated.

Further analysis by $^{31}P$ nmr showed that an essentially pure polymer had been isolated.

EXAMPLE 2
Isolation of poly(vinylphosphonic acid)

The process of Example 1 (above) was repeated, using a bath containing poly(vinylphosphonic acid).

A first portion of the acidified polymer solution was diafiltered by means of a set of 5 GR90PP membranes. A second portion was diafiltered by means of a set of 5 GR95PP membranes (both sets available from Danish Separation Systems A/S, Denmark).

The initial concentration of the polymer in each portion was adjusted to about 6.7% and 2.7 volume equivalents of water were passed through the system at a pressure of 2 bar, until the conductivity of each portion of the polymer solution reached 82.6 m.S.

Each portion of the polymer solution was spray-dried (using apparatus available from Niro Limited, England) and the polymer was isolated.

Further analysis by $^{31}P$ nmr showed that an essentially pure polymer had been isolated from each portion of the polymer solution.

EXAMPLE 3

To 200 Kg of a spent bath with white precipitate containing 0.2% poly (vinylphosphonic acid-co-acrylic acid), 600 p.p.m. aluminium, 190 p.p.m. iron, 30 p.p.m. chromium and 10 p.p.m. magnesium ions, was added 0.5 Kg of 50% sulphuric acid, 0.5 Kg of hydrochloric acid, 0.5 Kg of phosphoric acid and 0.5 Kg of a 60% aqueous solution of 1-hydroxyethane-1, 1-diphosphonic acid (available from Albright & Wilson UK Limited as BRIQUEST* ADPA 60-A).

The treated solution was subjected to 12 dia-filtrations using an ES 404 membrane (available from PCI Membrane Systems Ltd).

After the 2nd, 4th and 6th dia-filtrations, 1 Kg of sulphuric acid and 1 Kg of BRIQUEST* ADPA 60-A was added to the bath.

After the 8th and 10th dia-filtrations, 1 Kg of sulphuric acid was added to the bath.

After the 12th dia-filtration, the solution was concentrated to achieve a 2% solution of the polymer. Analysis at this stage showed the presence of 2 p.p.m. or less of each of the aluminium, chromium and magnesium ions and 6 p.p.m. or less of the iron ions. Also, analysis showed that 2 p.p.m. or less of each of the ions of calcium, nickel, sodium and potassium was present in the solution.

The solution was further concentrated to 20% and subjected to 6 further dia-filtrations using an ES 404 membrane.

After the 6th dia-filtration a sample of the solution was filtered through a 0.45 micron filter paper. The filtrate was pale yellow in colour (colour value 0.04; turbidity 1.98 NUT) and was found to contain less than 2 p.p.m. in all of metal ions.

EXAMPLE 4

The process of Example 1 was repeated, using a NF 45 membrane (available from Danish Separation Systems A/S) and a 20% solution of the polymer was isolated.

EXAMPLE 5

The process of Example 2 was repeated, using a NF 45 membrane (available from Danish Separation Systems A/S) and a 20% solution of the polymer was isolated.
*BRIQUEST is a Registered Trade Mark.

What is claimed is:

1. A method of recovering polymers in a substantially pure form from a solution containing said polymers, wherein said method comprises the following steps:

(a) treating said solution with a reactant so as to form free polymers and one or more salts of said reactant in said solution;
    (b) subjecting said solution (a) to membrane filtration to remove said one or more salts therefrom;
    (c) concentrating said membrane filtered solution (b) and recovering said free polymers therefrom; and
    wherein said solution contains at least one polymer selected from the group consisting of
       (i) copolymers of vinylphosphonic acid and acrylic acid;
       (ii) copolymers of vinylphosphonic acid and methacrylic acid;
       (iii) homopolymers of vinylphosphonic acid;
       (iv) oligomers of vinylphosphonic acid;
       (v) terpolymers of vinylphosphonic acid, acrylic acid and vinylsulphonic acid;
       (vi) homopolymers of vinylidene-1, 1-diphosphonic acid (VDPA);
       (vii) copolymers of VDPA with a water-soluble monomer;
       (viii) terpolymers of VDPA and two water-soluble monomers;
       (ix) VDPA-funtionalised polymers; and
       (x) polymers containing phosphono-succinic acid.

2. The method of claim 1, wherein said reactant used in treating step (a) consists essentially of at least one acid selected from the group consisting of sulphuric acid, hydrochloric acid and phosphoric acid.

3. The method of claim 1, wherein said reactant in treating step (a) is a sequestrant consisting essentially of 1-hydroxyethane-1, 1-diphosphonic acid.

4. The method of claim 1, wherein said reactant used in treating step (a) comprises a mixture of at least one acid selected from the group consisting of sulphuric acid, hydrochloric acid and phosphoric acid and a sequestrant consisting essentially of 1-hydroxyethane-1, 1-diphosphonic acid.

5. The method of claim 1, wherein said solution containing said at least one polymer also contains at least one complex of said at least one polymer with a metal selected from the group consisting of aluminum and iron.

6. The method of claim 1, wherein said membrane-filtration is carried out by a membrane made from a ceramic material, from one or more polymeric materials or from a layer of a polymeric material supported on a paper substrate.

7. The method of claim 1, wherein said polymers are selected from the group consisting of (i) copolymers of vinylphosphonic acid and acrylic acid, (ii) copolymers of vinylphosphonic acid and methacrylic acid, (iii) homopolymers of vinylphosphonic acid, (iv) oligomers of vinylphosphonic acid, and (v) terpolymers of vinylphosphonic acid, acrylic acid and vinylsulphonic acid.

8. The method of claim 1, wherein said polymers are selected from the group consisting of (i) homopolymers of vinylidene-1, 1-diphosphonic acid (VDPA), (ii) copolymers of VDPA with a water-soluble monomer, (iii) terpolymers of VDPA with two other water-soluble monomers, (iv) VDPA-functionalised polymers and (v) polymers containing phosphono-succinic acid.

* * * * *